United States Patent

Farr et al.

[15] 3,652,793

[45] Mar. 28, 1972

[54] FACSIMILE APPARATUS HAVING PLURAL RECIPROCATING SCANNING HEADS

[72] Inventors: Gerald Farr, Sanderstead, Surrey; Frances M. Anderson, Beckenham, Kent; Eric Thomas Arthur Phillips, Bromley, Kent, all of England

[73] Assignee: Muirhead Limited, Beckenham, Kent, England

[22] Filed: Mar. 25, 1969

[21] Appl. No.: 810,111

[30] Foreign Application Priority Data

Mar. 29, 1968 Great Britain ....................15,400/68
Mar. 29, 1968 Great Britain ....................15,401/68
Mar. 29, 1968 Great Britain ....................15,402/68

[52] U.S. Cl. ..............................178/7.6, 178/6, 178/6.6 R, 346/139 A

[51] Int. Cl. ..................G01d 15/24, H04n 1/14, H04n 1/22

[58] Field of Search...................178/7.6, 6, 6.6 R; 346/139, 346/139 A

[56] References Cited

UNITED STATES PATENTS

| | | | |
|---|---|---|---|
| 3,302,210 | 1/1967 | Welsh | 346/139 A |
| 3,465,145 | 9/1969 | Leiter | 178/6 |
| 2,587,145 | 2/1952 | Grib | 346/113 |

*Primary Examiner*—Howard W. Britton
*Attorney*—Holman & Stern

[57] ABSTRACT

Facsimile apparatus is provided with a scanning assembly which is reciprocated back and forth by a drive imparted to it from forward and return runs of at least one flexible belt loop continuously driven in one direction only by a constant speed motor. Such a drive can be cheaply and compactly manufactured and also lends itself readily to driving simultaneously and in synchronism several scanning heads which are each responsible for scanning a unique section of a line. The scanning assembly is usable in a facsimile transmitter, a facsimile receiver, or a facsimile transreceiver.

10 Claims, 7 Drawing Figures

INVENTOR
GERALD FARR ET AL
BY Holman, Glascock, Downing & Seebold
ATTORNEYS

INVENTOR
GERALD FARR ET.AL.
BY Holman, Glascock, Downing & Seebold
ATTORNEYS

INVENTOR
GERALD FARR ET AL.
BY Holman, Glascock, Downing & Seebold
ATTORNEYS

FACSIMILE APPARATUS HAVING PLURAL RECIPROCATING SCANNING HEADS

This invention relates to facsimile apparatus and is particularly concerned with a novel form of facsimile scanning mechanism suitable for use in either a facsimile transmitter or receiver or a combined transmitter-receiver.

A facsimile link comprises a facsimile transmitter and a facsimile receiver. Scanning mechanisms incorporated into the transmitter and receiver operate in synchronism so that a portion of a document being copied in the facsimile transmitter is simultaneously reproduced at the same relative position in the facsimile receiver.

The facsimile transmitter scans the document to be copied in a raster pattern with a spot of light. The intensity of reflected light from the document is detected by a light-sensitive element and used to produce an electrical output which is transmitted to the facsimile receiver. The exact position of the scanning spot during transmission is normally controlled by a lead screw or similar device which is rotated at a constant speed to move the scanning mechanism, generating the spot, across the surface of the document to be copied.

The electrical signals from the facsimile transmitter are received at the receiver and converted into an electrical current fed to a stylus which is applied to a copying paper or similar sheet of material on which the document is to be copied. The stylus is scanned across the copying paper by the scanning mechanism and it commonly takes the form of an elongated helix which presses the copying paper against a straight edge having an electric potential different from the helix. The paper is marked to an intensity dependent on the voltage generated between opposite sides of the pinch formed between the helix and the straight edge. It will be appreciated that as the helix is rotated about its axis, the pinch travels across the copying paper which is thus marked with a line having a varying intensity along its length which reflects the strength of the incoming signal from the transmitter. In this way a facsimile of the document to be copied is built up on the paper by a raster of closely spaced lines.

An object of this invention is the provision of an improved scanning mechanism which is capable of being used in a facsimile receiver, a facsimile transmitter or a combined transmitter-receiver.

Facsimile apparatus is provided, in accordance with the broadest aspect of this invention, with a scanning mechanism comprising a carriage movable along a straight path and positionally controlled by a reciprocating drive having its oppositely directed strokes obtained, respectively, from forward and return runs of a belt loop adapted to be continuously driven in one direction by a constant speed motor.

The broad principle of the invention may be used to provide scanning mechanisms operating in several different ways.

In one example of scanning mechanisms a single carriage is mounted on a straight rail, defining its path of movement, and is reciprocated back and forth along the rail to perform successive scans in opposite directions. The drive from the motor may be applied through suitable reduction gearing to the belt loop which may be provided with a lateral protrusion or finger, suitably comprising part of a crosspiece which is fixed to two identical spaced belts running parallel to one another, engaging a guide on the carriage. The guide is conveniently provided by a channel extending perpendicularly to the forward and return runs of the belt. The protrusion or finger may be a snug sliding fit in the channel which allows the finger to move in order to pass from the return run of the belt to the forward run, and vice versa, but which prevents any relative movement occurring between the carriage and the crosspiece in the direction of the forward and return runs. The carriage may be provided with suitable electrically controlled equipment for enabling it to scan a document to be copied when the apparatus is to behave as a facsimile transmitter; or with equipment such as an electrically controlled stylus for enabling the apparatus to operate as a facsimile receiver; or with both sorts of equipment to provide apparatus selectively operable as a facsimile transmitter or as a facsimile receiver. The electrical connections to the equipment on the carriage are suitably made through a flexible cable. After each stroke of the carriage stepping means in the apparatus move the copying sheet or document to be copied one step before commencement of the next scan of the mechanism.

In a second form of the invention the scanning mechanism is provided with two carriages fixed at spaced position on an inextensible band forming an elongated loop running over pulleys and reciprocated back and forth between the pulleys by a member extending laterally away from the drive belt which extends alongside the band, the two carriages being mounted on respective rails and so arranged that movement of one of the carriages in one direction is accompanied by simultaneous movement of the other carriage in the opposite direction. Each of the carriages may be provided, in the case of a facsimile transmitter, with light sensitive elements for viewing a line to be copied and which are directed towards the same line. Suitable reversing switches are provided to ensure that only one of the light-sensitive elements is operated at a time. In use, a line to be scanned by the transmitter is viewed by one of the elements as the associated carriage travels along its rail while simultaneously the other carriage, carrying the other element which for the time being is inoperative, is returning to the beginning of the line. At the end of the scanned line the reversing switches are operated so that the commencement of the next scan can commence by the other light-sensitive element as its carriage is now at the correct position to begin a line scan. In this way the time interval between successive scans can be reduced to an insignificant value enabling relatively high facsimile reproduction speeds in a relatively simple manner.

In a third arrangement of the invention the scanning mechanism is provided with two carriages which are arranged to scan, respectively, adjoining sections of the same line and which are moved in antiphase to one another by respective reciprocating drives derived from the same constant speed motor. In the preferred arrangement of such a mechanism the two carriages are individually reciprocated back and forth by respective belt loops which are connected to one another by a 1:1 gearing. An advantage of such an arrangement is that the scanning of the line can be arranged always to take place from, for example, left to right; opposite halves of the line being scanned by respective carriages one of which travels back towards its scan-start position while the other carriage is scanning its portion of the line. By arranging the carriages in this way no time is lost between consecutive scans. In such an arrangement the two carriages may run on the same rail and suitable reversing switches may be used to energise the electrical circuitry on the carriage alternately.

The invention will now be described in more detail, by way of example, with reference to the accompanying drawings, in which.

Figures 1, 2, 3:
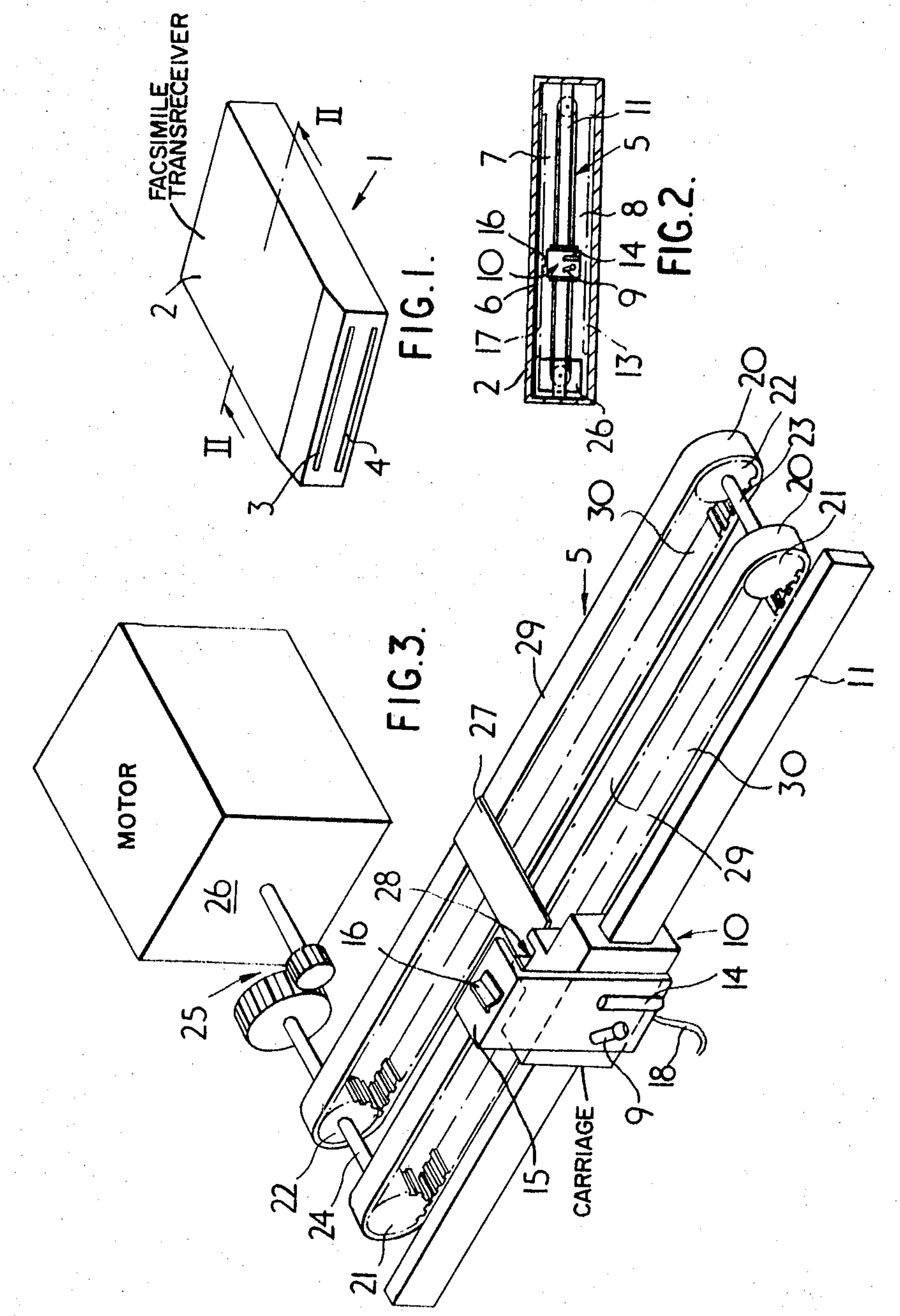
FIG. 1 is a perspective view of a combined facsimile transmitter-receiver apparatus.
FIG. 2 is a diagrammatic cross section through FIG. 1 and taken on the line indicated by the arrows II-II in that Figure.
FIG. 3 is a diagrammatic perspective view of one form of scanning mechanism used in the transmitter-receiver.

Referring to FIG. 1, a combined transmitter-receiver facsimile reproducing apparatus 1 has a casing 2 provided with two vertically spaced horizontal parallel slots 3, 4 the lower 3 of which is to receive the document to be copied and the upper 4 of which is to receive the copying paper which is marked electrically, for example paper known commercially as "Mufax" paper. The casing 2 is provided with a drive mechanism (not shown) which is adapted to move the document to be copied stepwise in exact synchronism with corresponding movements of a copying sheet.

FIGS. 2 and 3 show details of one embodiment of the apparatus of the invention. The apparatus is provided with a scanning mechanism 5 disposed between two parallel spaces 7, 8 formed in the casing above and below the mechanism 5, and respectively for the reception of the document to be copied and the copying sheet. The scanning mechanism 5 comprises a carriage 10 which is slidable along a track provided by a rail 11 extending parallel to the slots 3, 4 in the casing 2 and at right angles to the direction of movement of the document and copying sheet. The carriage 10 carries on its lower half a lens-fronted bulb 9 which projects a beam of light onto a small area of the underlying document, diagrammatically shown at 13 in FIG. 2, disposed directly beneath a photoelectric element 14 such as a photocell or a photosensitive transistor. The reflected light from the document 13 is detected by the element 14 and modulates an electrical current which controls the transmitted signal from the apparatus.

The top of the carriage 10 is provided with a horizontal flange 15 shown in FIG. 3 and having an upwardly directed springy electrical contact 16. The contact 16 is positioned to engage the undersurface of a copying paper, diagrammatically shown at 17 in FIG. 2, as it passes over the carriage 10 and to press the paper upwardly against a straight edge 6. Electrical connections to the travelling carriage are provided by flexible leads 18.

The carriage 10 is reciprocated back and forth along its rail 11 by a drive transmitted from two spaced parallel belts 20 which are internally ribbed as shown to cooperate with grooves or pulleys 21, 22 over which they pass in non-slipping manner. The pairs of pulleys 21, 22 driving opposite ends, respectively, of the two belts are each mounted on a common shaft 23, 24 and one of the shafts 24 is driven through a speed reduction gear 25 from an effectively constant speed electric motor 26.

A crosspiece 27 is fixed to the two belts 20 at similar positions so that it extends at right angles to the direction of movement of the belts 20. One end portion 27 of the crosspiece extends beyond one of the belts 20 and engages inside a vertical guide slot 28 formed in the adjacent side of the carriage 10 and extending perpendicularly to the carriage rail 11 and the planes of the upper and lower runs 29, 30 respectively of the belts 20.

In operation of the transmitter-receiver, the electric motor 26 drives the two identical parallel belts 20 synchronously at the same speed. The crosspiece 27 therefore travels from left to right on the upper run 29 of the belts 20 and from right to left on the lower run 30 of the belts 20. This movement is imparted to the carriage 10 by way of the guide slot 28 in which the crosspiece 27 engages so that the carriage 10 reciprocates back and forth along its rail 11. During the vertical movement of the crosspiece 27 as occurs when it travels over the pairs of pulleys 21, 22 at opposite ends of the belts 20, the carriage 10 is decelerated and then accelerated in the reverse direction as the crosspiece 27 takes up a fresh position in the guide slot 28.

Triggering signals are transmitted by the carriage 10 at opposite ends of its stroke along the rail 11 by elements (not shown) and these are used to synchronise the movement of the similarly constructed carriage of the transmitter-receiver apparatus which is to copy the document. Between successive strokes of the carriage 10 the document to be copied and the copying paper in the other apparatus move a step in synchronism and the electrical contact 16 of the transmitter-receiver apparatus in the receiving condition is energised at the commencement of each stroke of the carriage 10 by a signal generated by the transmitter carriage. Successive lines are thereby reproduced in step with one another at the receiver during operation of the transmitter.

It will be appreciated that the use of a continuously movable belt loop to reciprocate the carriage 10 back and forth along its rail 11 enables copying to take place quickly by the traversing carriage 10 which is selectively operable to control the apparatus as a receiver or as a transmitter.

Turning now to the second embodiment of the invention the arrangement of scanning mechanism shown in FIG. 4 will now be described, parts of the mechanism corresponding to parts of FIG. 3 bearing the same reference numerals.

Figures 4, 5, 6:
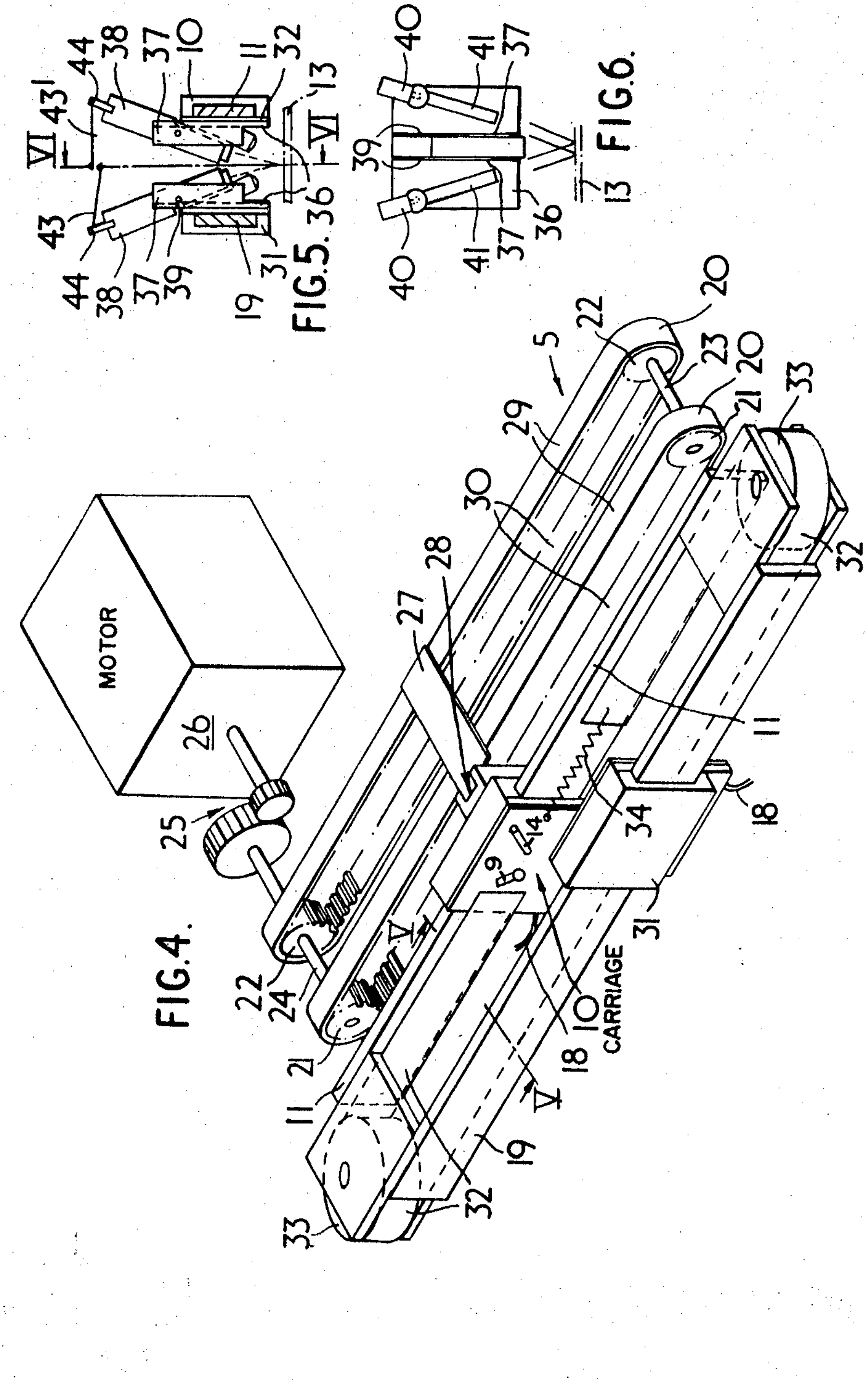
FIG. 4 is a diagrammatic perspective view of a second form of scanning mechanism.
FIG. 5 is a scrap section through the apparatus of FIG. 4 and taken on the line and in the direction indicated by the arrows V-V in that Figure.
FIG. 6 is a view of parts of FIG. 5 taken on the line indicated by the arrows VI-VI in that Figure; and, FIG. 7 shows a third arrangement of scanning mechanism in diagrammatic form.

As shown in FIG. 4 a constant speed drive from an electric motor 26 is applied through reduction gearing 25 to a shaft 24 having fixed to it a pair of toothed pulleys 21, 22 over which run respective internally toothed belts 20. Extending perpendicularly between the two belts is a cross-plate 27 fixed to the two belts and extending at one end beyond the belts 20 which run over the pulleys 21 so that its end extension provides a finger locating in a vertical slot 28 providing an upright guide in the carriage 10. The carriage 10 is formed with a slot through which passes a rail 11 providing a straight path along which the carriage 10 can reciprocate back and forth as a result of the drive transmitted to it by the cross-plate 27 as it travels with the belts 20 around the pulleys 21, 22. Thus far the scanning mechanism is identical to that shown in FIG. 3.

Extending parallel to rail 11 is a second rail 19 on which is slidable a second carriage 31 identical to the carriage 10 but facing in the opposite direction. The carriage 31 is rigidly fixed to an inextensible flexible metal band 32 which passes around guide drums 33 having upright axes. One end of the belt 32 is fixed to the carriage 10 while the other end is fixed to one end of a tensioning spring 34 whose other end is fixed to the carriage 10. The carriage 31 is attached to a position on the band 32 such that when the carriage 10 is in the center of the rail 11, the carriage 31 is in the center of the rail 19. As the two carriages 10, 31 are connected by the tensioned band 32, movement of the carriage 10 in one direction is accompanied by movement of the carriage 31 in the opposite direction. Thus when carriage 10 has completed its stroke in one direction, carriage 31 is in a position to begin a second stroke in the same direction.

FIG. 5 shows how scanning devices are mounted on the carriages 10 and 31. The opposed faces of the two carriages are covered by mounting plates 36 provided centrally with a pair of upright parallel flanges 37. A light-sensitive element 38 containing an optical system and a photocell is pivoted at 39 between the two flanges 37 and is provided with a clamping device for enabling it to be locked at a particular inclination.

FIG. 6 is a face view of one of the plates 36, the photo-sensitive element 38 having been omitted. From FIG. 6 it will be seen that the upper two corners of the plate 36 are provided with lamps 40 arranged to direct light downwardly through a pair of tubes 41 inclined towards one another at their lower ends so that they direct the light from the lamps 40 to a spot which overlaps the line of sight of the light-sensitive element 38 on the surface of the document 13 as shown in FIG. 5.

The electrical operating equipment carried by the carriages 10 and 31 is not shown. The operation of the equipment on each of the carriages is controlled by changeover switches mounted at opposite ends of the strokes of one of the carriages and which ensure that only the carriage travelling from left to right in the arrangement shown in FIG. 4 has its electrical equipment energised. The electrical equipment of the other carriage which is travelling from right to left is de-energised as it is carrying out the return stroke of its movement.

The two carriages are each provided with a stylus 43, 43'. These are mounted at the upper ends of the elements 38 and are displaceable between upper and lower positions. In FIG. 5 the stylus 43' is shown in its upper position while the stylus 43 is shown in its lower position. The styli 43, 43' are essentially formed by plates hinged at 44 and which are displaced between their two positions by a rocking mechanism, not shown, which is operated by engagement with an abutment at each end of the travel of the carriages 10, 31. Thus, the carriage moving from left to right in FIG. 4 always has its stylus 43' in the upper position so that it can press a paper on which copying is to take place upwardly against the straight edge 6 shown in FIG. 2 during the reception of facsimile signal information. Flexible leads 18 extend to the undersides of the two carriages 10, 31 to carry the electrical information to and from the carriages as they reciprocate back and forth along the rails 11, 19.

In operation of the scanning mechanism the two carriages 10 and 31 reciprocates back and forth along their respective rails in opposite directions. During the stroke of each carriage from left to right as shown in FIG. 4, the associated electrical equipment of the carriage is energised while the other carriage, which is performing its recovery stroke, has its electrical equipment de-energised.

If the carriage moving from left to right in FIG. 4 is to operate as a transmitter, the light-sensitive element 38 and the lamps 40 are energized at the commencement of the carriage stroke and the light-sensitive element provides an electrical output signal which is significant of the intensity of light reflected from the center of the illuminated area of the document 13.

At the end of the stroke the reversing switches are operated and the energisation circuitry of the electrical equipment carried by the carriages is reversed so that scanning of the next line of the document 13 can commence immediately. The two light-sensitive elements have their optical axes coincident on the same line so that successive lines of the document 13 scanned have the same spacing from one another determined by a suitable drive mechanism which is not shown.

If the carriages are to act as receivers, the electrical signals which are to mark the copying paper are fed to whichever of the styli is in the uppermost position. In FIG. 5 that stylus is referenced 43'. As the carriage travels from left to right the stylus 43' presses the copying sheet upwardly against the straight edge 6 to reproduce on it a line of varying intensity dependent on the strength of the electrical signal fed to the stylus. At the end of the carriage stroke, the two styli 43, 43' are reversed in position so that the reproduction of the next line of the facsimile scan is carried out by the other stylus during the following stroke.

Figure 7:
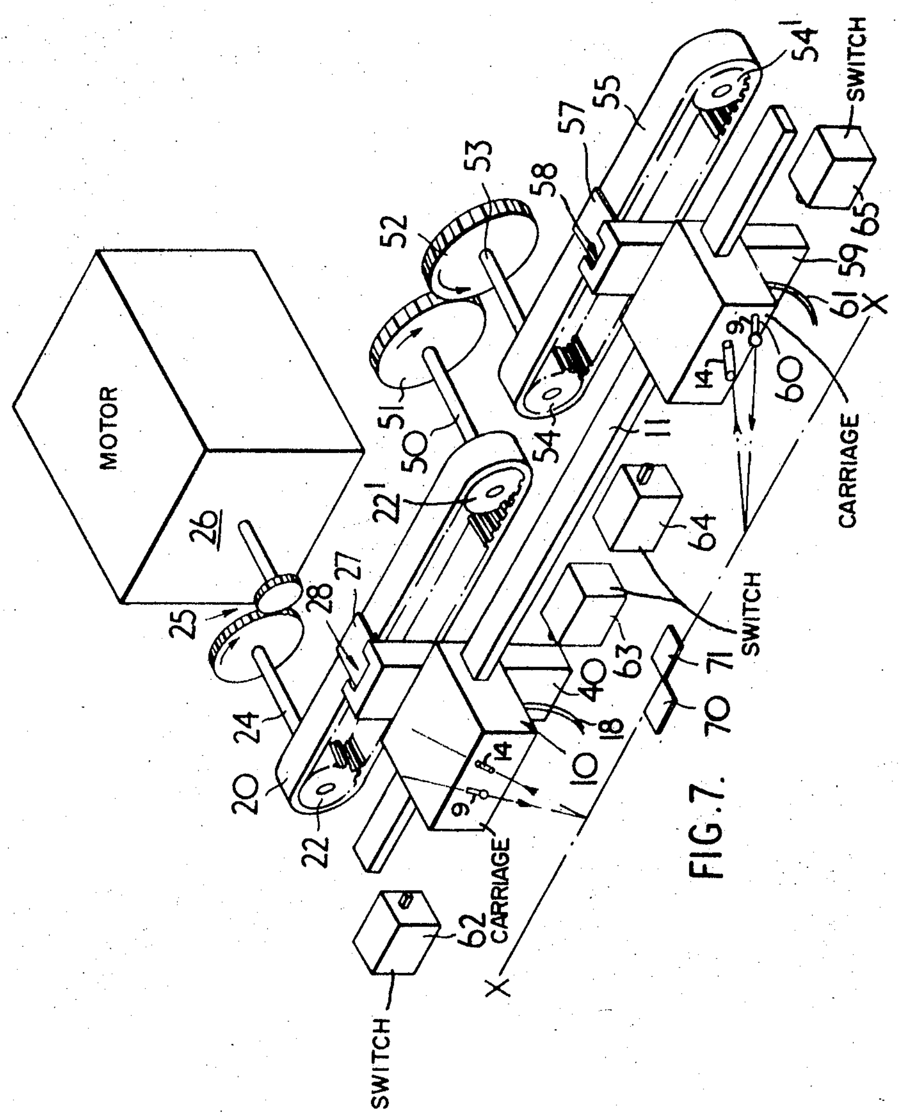

Turning now to the third embodiment of the invention, shown in FIG. 7, the scanning mechanism has a constant speed electric motor 26 which drives through speed reduction gearing 25 a shaft 24 having a toothed pulley 22 on one end. An internally ribbed belt 20 passes around the pulley 22 and around a second pulley 22'. The belt has fixed to it a crosspiece 27 formed as a plate securely anchored to the belt 20 and extending at one end beyond the side of the belt to provide a finger which is a snug fit within an upright channel 28 formed in a channel bar 40 provided at one side of a carriage 10. The carriage 10 is slidable lengthwise of a rail 11. The carriage 10 is provided with a downwardly directed document scanning device and associated light source which are not shown but which may take the form shown in FIG. 3. Likewise the carriage 10 is provided with an upwardly directed stylus (not shown) for pressing a copying sheet against a straight edge such as that referenced 6 and shown in FIG. 2. A flexible cable 18 carries the electrical circuitry of the apparatus to the carriage 10. Thus far the scanning mechanism is similar to that shown in FIG. 3.

The toothed pulley 22' has a shaft 50 carrying on its end a pinion 51 meshing with a pinion 52 of the same diameter and carried at one end of a shaft 53. The other end of the shaft 53 carries a second toothed pulley 54 which is identical to the two pulleys 22 and 22'. An internally ribbed belt 55 passes over the toothed pulley 54 and also over a second and identical toothed pulley 54' provided at the other end of the belt 55.

Attached to the belt is a crosspiece 57 having a finger which locates snugly within a channel 58 provided in an upright channel 59 attached to one side of a carriage 60 which is also slidable along the rail 11. The carriage 60 and the channel bar 59 are identical to the carriage 10 and channel bar 40. An electrical cable 61 is flexible and carries the electrical signals to and from the scanning equipment carried by the carriage 60.

At each end of the path of movement of the carriage 10 are changeover switches 62, 63. Likewise a pair of changeover switches 64, 65 are disposed, respectively at opposite ends of the path of travel of the carriage 60. Although the light-sensitive elements carried by the carriages 10 and 60 and which are energised during facsimile transmission are not shown on the carriages, the paths of light from the light sources on the carriages are shown diagrammatically as being directed towards a line shown in pick and dot and referenced X-X. Likewise the paths of reflected light from the line X-X to the light-sensitive elements of the carriages 10, 60 are also shown by arrowed lines. The document to be copied is passed stepwise through the apparatus horizontally beneath the scanning mechanism so that its surface coincides with the line X-X.

As is clearly shown by the arrowed lines in FIG. 7 the optical elements of the two carriages 10 and 60 are directed slightly towards one another so that they superimpose on the line X-X when the carriage 10 has completed its stroke to the right of the drawing, and the second carriage 60 has completed its fly-back stroke to the left. These two strokes occur simultaneously by virtue of the 1:1 gearing formed by the pinions 51 and 52 which transmit the drive of belt 20 to belt 55. The document to be copied passes beneath a pair of rectangular plates 70, 71 arranged corner to corner and each having two adjacent sides one of which is aligned with the line X-X and the other of which extends perpendicularly to the line at the place where the scan is to be transferred from the carriage 10 to the carriage 60. The upper surfaces of the plates 70, 71 are matt black so that they reflect virtually no light when the incident light beam projected by the carriage 10 towards the line X-X is incident on the plate 71. The plate 71 intercepts the light beam from the carriage 10 whereas the plate 70 intercepts the light beam from the carriage 60. Switching equipment responds to the viewing of the plates 70, 71 by the light-sensitive elements of the carriages by switching over the connections so that the first part of the line X-X on the document to be copied is scanned by the carriage 10 whereas the adjoining section of the line is scanned by the carriage 60 and a smooth transfer between the scanning systems of the two carriages occurs at the junction of the plates 70, 71.

As previously mentioned, each of the carriages carries an electrically energisable stylus for use when using the apparatus as a receiver. The two styli of the carriages are so disposed that they occupy raised positions at which they press the copying sheet against the straight edge disposed above the rail 11, only when the styli are travelling from left to right of FIG. 7. The raising and lowering of the styli may be performed by suitable devices with which the styli cooperate at opposite ends of their paths of movement. The smooth transfer of the receiver input electrical signals from one of the styli to the other at the position where carriage 60 takes over the scan from carriage 10, is performed by the switching devices 62 to 65 which are operated by the carriages 10 and 60 at opposite ends of their strokes. The switching devices 62 to 65 may also be used to transfer the transmitter scanning signals from the carriage 10 to the carriage 60 in place of the two plates 70 and 71.

It will be noted that one advantage of the Applicants's construction of facsimile apparatus is that it allows both the sheets to be copied and the copying sheets on which facsimile reproductions are made, to pass through the apparatus absolutely flat so that they emerge unbent and without any noticeable tendency to curl up in the way which happens when the sheets are wound around a facsimile drum.

A second advantage is that the facsimile transmission speed can be high as successive lines are transmitted and received during successive strokes in opposite directions of the scanning mechanisms.

We claim:

1. Facsimile apparatus comprising a casing having a slot provided at one end of a paper feed passage extending through said casing, a scanning mechanism in said casing and comprising two carriages each reciprocatable back and forth along a straight path extending transversely of said passage but lying in a plane parallel thereto, a constant speed motor in said casing, a belt loop driven in one direction by said motor and having parallel forward and return runs, and drive means operatively connecting said loop to said carriages whereby said carriages move in antiphase with one another and their reciprocating strokes in opposite directions are produced by forward and return runs, respectively, of said belt loop.

2. Apparatus as set forth in claim 1, having one straight rail on respective adjoining sections of which said two carriages are mounted, said rail defining colinear paths of movement of said carriages.

3. Apparatus as set forth in claim 2, in which said belt loop is connected directly to one of said carriages and also to a second belt loop identical to the aforementioned belt loop and directly connected to the second carriage, said two belt loops being connected through a 1:1 gearing producing rotational movement of said belt loops in opposite directions, respectively.

4. Facsimile apparatus comprising a casing having a slot provided at one end of a paper feed passage extending through said casing, a scanning mechanism in said casing and comprising two carriages each reciprocatable back and forth along a straight path extending transversely of said passage but lying in a plane parallel thereto, a constant speed motor in said casing, a belt loop driven in one direction by said motor and having parallel forward and return runs, drive means connecting said loop to one of said carriages, an inextensible band formed with a return bend and connecting said one carriage to the second carriage, two parallel rails on which respective carriages are mounted, and means operatively connected to interchange electrical connections between the carriages whereby said two carriages are reciprocated in antiphase to one another by movement imparted to said one carriage by the forward and return runs, respectively, of said belt loop, and said interchange means operate at the end of the reciprocating strokes of the carriages to shift the scan between the carriages.

5. Apparatus as set forth in claim 4, in which said interchange means comprise switching means mechanically operated by said carriages at opposite ends of their reciprocating movement.

6. Apparatus as set forth in claim 4, in which said band is maintained in tension by a spring connected to one of said carriages and interconnects opposite sides of each of said carriages and has a return bend passing around a pulley at each end of said rails.

7. Facsimile transreceiver apparatus comprising a casing having a first slot provided at one end of a document feed passage extending through said casing, a second slot provided at one end of a copying sheet feed passage extending through said casing, a scanning mechanism in said casing and disposed between said passages, at least one carriage forming part of said scanning mechanism and reciprocable with oppositely directed strokes along a straight path extending perpendicular to the direction of feed through said passages but lying in a plane parallel thereto, a constant speed motor in said casing, a belt loop driven in one direction by said motor and having parallel forward and return runs, drive means connecting said loop to said carriage, facsimile transmitting means mounted on said carriage and directed towards said document feed passage, facsimile receiving means mounted on said carriage and directed towards said copying sheet passage, changeover means operatively controlling said receiving means and said transmitting means to control said apparatus selectively as a facsimile transmitter or a facsimile receiver; a second carriage reciprocated in unison and in antiphase with said first carriage and carrying second transmitting means and second receiving means, and interchange switches operated by said carriages at the ends of their respective strokes whereby the scan of one carriage at the end of its stroke is transferred automatically to the second carriage, the arrangement of said apparatus being such that oppositely directed reciprocating strokes of said carriage are produced by forward and return runs, respectively, of said belt loop.

8. Apparatus as set forth in claim 7 in which said first and second carriages run on first and second parallel rails, respectively, two pulleys disposed each at one end of said parallel rails, an inextensible flexible band passing around said pulleys and to which said carriages are connected at spaced positions whereby said carriages are moved by said band in antiphase to one another.

9. Facsimile apparatus comprising a scanning station sheet drive means, a scanning assembly at said station, two scanning units in said assembly and associated with adjacent sections of a scan line, scanning drive means operatively connected to reciprocate said scanning units in antiphase along respective adjacent sections of said scan line, scanning heads in said scanning units, static electrical circuitry in said apparatus, flexible electrical connections extending between said scanning units and said static circuitry, and means operable to transfer the scan from one head to the other head; whereby said drive means moves said sheet through said scanning station in one direction which is transverse to the direction of reciprocation of said scanning units.

10. Apparatus as set forth in claim 9 in which said scanning drive means include a constant speed drive source.

* * * * *